Sept. 15, 1942.  C. L. SCHEER  2,295,759
CAPACITOR
Filed June 30, 1939
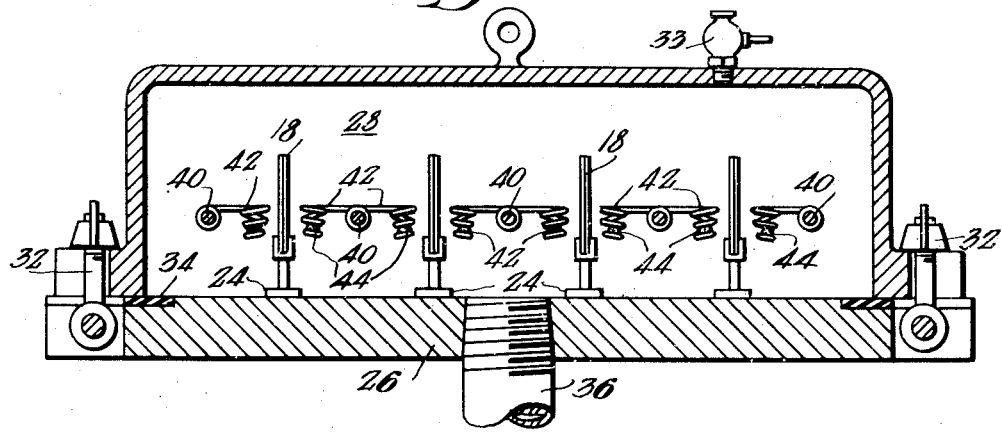
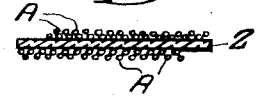
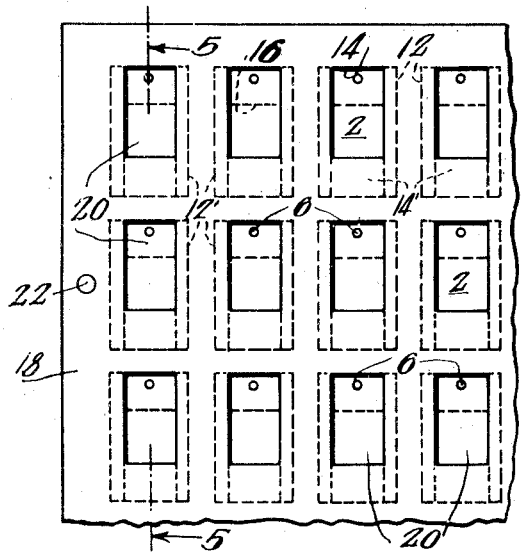
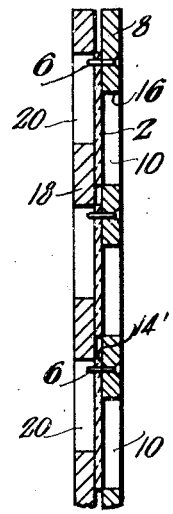
Inventor
Charles L. Scheer
By
Attorney Patented Sept. 15, 1942

2,295,759

UNITED STATES PATENT OFFICE 2,295,759

CAPACITOR

Charles L. Scheer, Haddonfield, N. J., assignor to Radio Corporation of America, a corporation of Delaware Application June 30, 1939, Serial No. 282,299

5 Claims. (Cl. 175—41)

This invention relates to capacitors of the type wherein the armatures comprise metal applied in a finely divided state to the mica or other dielectric, and to methods of making such capacitors.

The principal object of the invention is to provide an improved capacitor, of the general type described, which exhibits a lower power factor than has heretofore been thought possible of practical achievement.

Another and important object of the present invention is to provide a simple, inexpensive and trouble-free method of accomplishing the aforesaid object, and one which lends itself readily to the mass production of capacitors of the general type described.

Other objects and advantages will be apparent and the invention will be best understood by reference to the following specification and to the accompanying drawing, wherein Figure 1 is a sectional view of part of a capacitor and illustrates the lack of homogeneity in the metallic films of the prior art;

Figure 2 is a view of the capacitor of Fig. 1 subsequent to being treated in accordance with the principle of the invention and illustrates the homogeneity and physical continuity of the metallic films;

Figure 3 shows, in sectional elevation, one form of an apparatus for depositing metal in a finely divided state upon mica or other dielectric elements;

Figure 4 shows, in front elevation, a rack for supporting a number of dielectric elements in the apparatus of Fig. 1;

Figure 5 is a cross-sectional view taken on the line 5—5 of Fig. 4; and

Figure 6 is a side elevational view of an elemental capacitor constructed in accordance with the principle of the invention.

The present invention is predicated upon the fact, revealed by microscopic examination, that the metallic "films" or "layers" or "surface coatings" of the prior art lack perfect physical continuity and homogeneity. This may be attributed to the fact that such films are usually applied to the mica or other base in the form of spray, vapor or solution constituted of discrete globules, or spaced apart molecules of metal which, as indicated at A, Fig. 1, to a substantial degree retain their physical identity and haphazard distribution when the deposition process has been completed. This lack of physical continuity and homogeneity is manifest by the relatively high direct current resistance of the metallic films and is also manifest in the finished capacitors by the substantial power factor which they exhibit in use.

The present invention contemplates and its practice provides, a metallic film wherein the discrete globules of metal, characteristic of untreated films, may be said to lose their identity and form a sheet characterized by the substantially perfect physical and electrical continuity of the molecules of which it is constituted. This desired result is achieved in accordance with the method of the invention by subjecting a dielectric element, upon which the opposite metallic armature layers have been deposited, to a relatively high temperature for a period sufficiently long to produce softening and virtual flow of the metal, so that a welding, fusing, commingling or recrystallization of the formerly separate, or partly separated, molecules or globules of the metal is effected, as indicated by the smooth surfaces B in Fig. 2. This improved smoothness is usually evidenced in the finished film by its surface sheen.

While the method of the invention will be described as applied to a metallic film which has been deposited on the mica by thermal evaporation, distillation or sublimation, it will be apparent to those skilled in the art that the invention is likewise applicable to metallic films which have been deposited by means of the Schoop spray process, or by electroplating methods, or by cathodic disintegration, or by substantially any other known method or process for creating and applying metal in a finely divided state.

In carrying the invention into effect, the mica 2 is first split to the required thickness and cut to size. The individual mica plates are then preferably provided each with a punched orifice 4 adjacent one end thereof, whereby they may be suspended on pins 6, which project rearwardly from a frame 8 which is provided with apertures 10 individual to the discrete mica plates. As shown more clearly in Figs. 4 and 5, the dimensions of apertures 10 are somewhat less than those of the mica elements so that the side edges 12 and top edge 14 of each element are effectively shielded by the marginal edges 16 of the frame which surrounds each mica element. When all of the mica elements are in place in the frame 8, a masking plate 18, which is provided with a number of apertures 20, is clamped tightly over the frame as by bolts 22. The apertures 20 in the masking plate 18 are preferably of the same size, but are offset in the vertical direction from the apertures 10 in the frame 8 whereby the marginal side and bottom edges 12', 14', respectively, of the mica surface opposite the surface containing the masked edges 12 and 14, are exposed.

With the mica plates mounted on frame 8 and masked by the masking plate 18 in the manner above described, the assembly is supported on a suitable bracket 24 (Fig. 3) fixed to the base 26 of an evacuable enclosure 28. As illustrated in Fig. 3, the enclosure 28 comprises an inverted vessel 30 adapted to be clamped to the base 26 as by bolts 32. Suitable gaskets 34 are provided to ensure a gas-tight seal between the base 26 and the vessel 30. An outlet 36 communicates with the interior of the enclosure and is connected with a suitable pump, not shown, for evacuating the vessel. A valve 38 is provided for restoring atmospheric pressure when the mica has been processed. Supported in spaced relation above the base 26, as on rods 40 which extend between and along the frames 8—18 which support the mica, are a plurality of tungsten or other refractory metal filaments 42 which are each bent in a convenient form suitable for holding a piece 44 of the metal to be evaporated and deposited upon the exposed areas of the opposite surfaces of the mica.

The number and spacing of the filaments 42 containing the metal to be evaporated is preferably such that all of the mica plates are thoroughly and substantially equally bathed in metal vapor. The filaments 42 are preferably connected to a common source of heating current, not shown, so that when the enclosure 28 has become evacuated, evaporation of all of the metal elements 44 occurs, thereby effecting the coating of both sides of each mica plate simultaneously.

The absolute pressure maintained in the enclosure 28 during evaporation of the metal should, for optimum results, preferably be no higher and preferably less than 0.0001 mm. of mercury (one-tenth of a micron). However, the use of vacuum pressure considerably higher than one-tenth of a micron may be employed as it has been discovered that by varying the degree of vacuum up to, say, two microns, the ultimate capacitance of the elements may be varied over a substantial range. The general rule is the higher the vacuum, the higher the ultimate capacitance. This phenomenon obtains by reason of the relative quantity of gas and other foreign substances which are occluded in the metal during its evaporation and deposited upon the mica. Substantial freedom from occluded gases and foreign solids is achieved at the lowest pressure mentioned.

The deposition of the metal having been completed the vacuum is broken by opening the valve 38, the frames 8 are taken from the brackets 24, the masks 18 are lifted and the now coated mica plates 2 are removed. Subsequently and in accordance with the invention, these metallized dielectric plates are subjected to a temperature sufficient to cause a welding, fusing, commingling or recrystallization of the molecules or globules of which the metal films are constituted. Excellent results have been achieved simply by placing a batch of several hundred of these plates 2 in a tray in an ordinary oven (not shown) and subjecting them to temperatures of the order of 275–325° C. for a period of from, say, fifteen to thirty minutes. The temperature and duration of this heat treatment are not especially critical but may vary somewhat as determined by the nature of the metal and thickness of the applied films. Twenty minutes at approximately 300° C. is usually sufficient where the film is silver and of a thickness of the order of a few one-millionths of an inch. The heating may be done in vacuo, if desired, or partly in vacuo and partly at atmospheric pressure; however, as above indicated, excellent results have been achieved on a commercial scale in an ordinary oven operating at substantially atmospheric pressure.

Fig. 6 shows a capacitor comprising a stack of two elemental capacitors, each of which comprises a sheet of mica 2 and a pair of discrete metal films B which have been treated in accordance with the present invention to effect a commingling of the formerly separate, or partly separated molecules or globules of metal.

Comparative tests of evaporated-metal films before and after the described heat treatment showed a reduction of the order of substantially fifty percent in direct current resistance. Tests of complete capacitors showed a reduction in power factor of the order of seventy-five percent. By way of example, a number of untreated (but otherwise similar capacitors) exhibited a power factor of the order of .0006–.0008 at 1000 kilocycles, whereas those treated in accordance with the present invention exhibited a power factor of .0001 to .0003.

The foregoing description of the presently preferred apparatus and means for achieving the objects of the invention should be interpreted as illustrative and not in a limiting sense except as required by the prior art and by the spirit of the appended claims.

What is claimed is:

1. Method of decreasing the dielectric losses of a capacitor comprised of a pair of conductive film-like armatures constituted of metal in a finely divided state and adhering to the opposite surfaces of an interposed dielectric layer, said method comprising subjecting said capacitor to a temperature sufficiently high and for a period sufficiently long to cause softening and virtual flow of the metal.

2. Method of decreasing the dielectric losses of a capacitor comprised of a pair of conductive film-like armatures constituted of metal in a finely divided state and adhering to the opposite surfaces of an interposed dielectric layer, said method comprising subjecting said capacitor to a temperature of the order of from substantially 275° C. to substantially 325° C. for a period sufficiently long to cause softening and virtual flow of the metal.

3. Method of decreasing the dielectric losses of a capacitor comprised of a pair of conductive film-like armatures constituted of metal in a finely divided state and adhering to the opposite surfaces of an interposed dielectric layer, said method comprising subjecting said capacitor to a temperature of the order of from substantially 275° C. to substantially 325° C. for a period of the order of from substantially fifteen to thirty minutes.

4. Method of manufacturing a capacitor which comprises depositing a film constituted of metal in a finely divided state upon the opposite surfaces of a dielectric element, and subsequently subjecting said deposited film to a temperature sufficiently high and for a period sufficiently long to cause softening and virtual flow of said metal.

5. Method of manufacturing a capacitor which comprises mounting a dielectric element and a piece of metal in a vacuum, then subjecting said metal to a temperature sufficient to cause thermal evaporation of the metal whereby to cause it to be deposited in the form of a film upon the opposite surfaces of said dielectric element, and subsequently subjecting said coated element to a temperature sufficiently high and for a period sufficiently long to cause virtual flow of the metal constituting said film.

CHARLES L. SCHEER.